Figure 1:
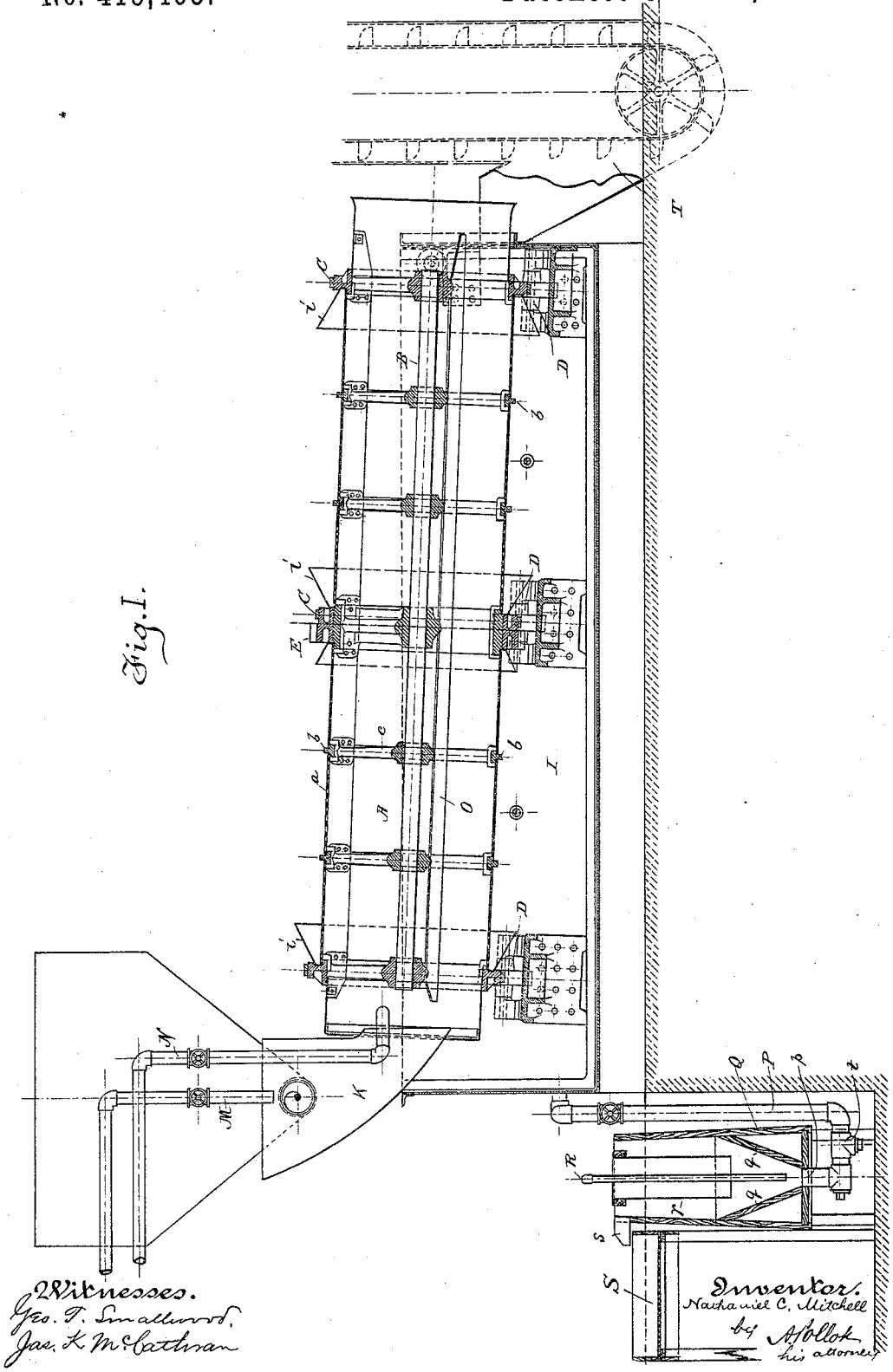

(No Model.) 2 Sheets—Sheet 1.

N. C. MITCHELL.
APPARATUS FOR WASHING RUBBER STOCK AND SEPARATING FINE IMPURITIES THEREFROM.

No. 419,465. Patented Jan. 14, 1890.

Witnesses.
Geo. T. Smallwood,
Jas. K. McCathran

Inventor.
Nathaniel C. Mitchell
by A. Pollok
his attorney

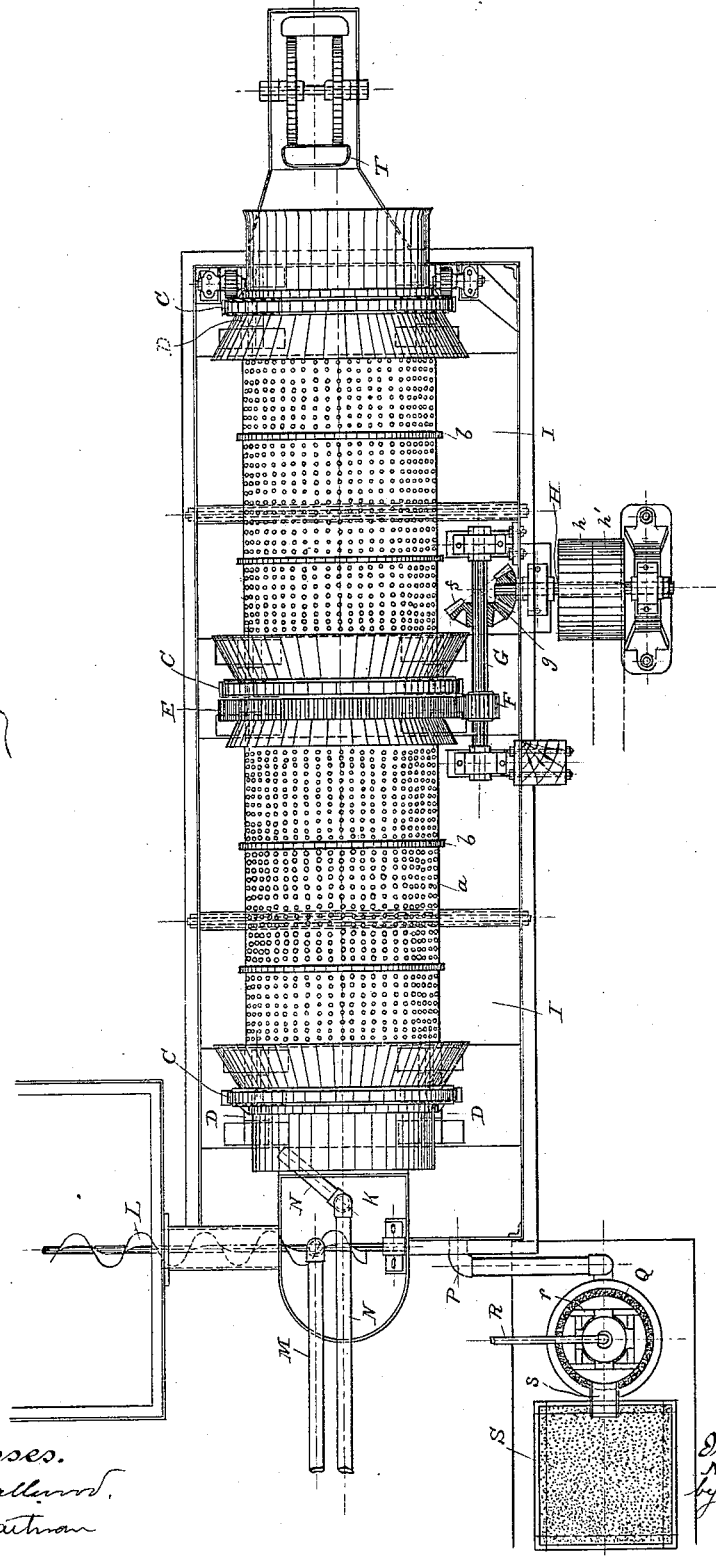

UNITED STATES PATENT OFFICE.

NATHANIEL C. MITCHELL, OF PHILADELPHIA, PENNSYLVANIA.

APPARATUS FOR WASHING RUBBER STOCK AND SEPARATING FINE IMPURITIES THEREFROM.

SPECIFICATION forming part of Letters Patent No. 419,465, dated January 14, 1890.

Application filed September 20, 1889. Serial No. 324,582. (No model.)

*To all whom it may concern:*

Be it known that I, NATHANIEL C. MITCHELL, of Philadelphia, in the county of Philadelphia and State of Pennsylvania, have invented a new and useful Improvement in Apparatus for Washing Rubber Stock and Separating Fine Impurities Therefrom, which improvement is fully set forth in the following specification.

This invention has reference to the treatment of rubber waste for the recovery of the rubber in condition for reuse in the manufacture of rubber goods in general.

It relates more particularly to the treatment of the stock after elimination of the fibrous matters for the removal of sand, dirt, and other fine impurities.

In application filed September 20, 1889, Serial No. 324,584, is described a washing tank or apparatus into which the stock is fed after treatment to disintegrate the fiber. From such washing-tank the stock is carried to a rotatory washer or separator. This apparatus, which is embraced herein, is a cylinder inclined downward from its mouth or feed end and supported in bearings over a tank or receptacle. The periphery of the cylinder is composed of perforated brass sheets, the size of the perforations being such as to arrest the rubber fragments but to permit the passage of sand or other fine particles. The stock is fed into the upper end of the cylinder and a copious stream of water is directed into the same at such an angle as to strike with violence against the stock, thereby carrying away much of the sand at the outset. As the cylinder rotates, the rubber stock is agitated and thrown repeatedly against the perforated shell, being continually turned over and over and gradually fed forward. This action, which is of an energetic character, sifts out practically all the particles of foreign substances which are of sufficient fineness to pass through the perforations, the water aiding in carrying these particles into the tank beneath. As the rubber approaches the lower end of the cylinder, at which point the perforations may be finer than at the upper end, the agitation it receives frees it of most of the moisture, so that it is delivered in a comparatively-dry state. The refuse removed by this operation contains a small quantity of rubber in fine particles which have passed through the perforations of the cylinder and which it is desirable to recover. To effect this, the tank onto which the refuse falls is connected by a pipe with a specific-gravity separator. The water by which the sand and dirt was washed through the perforated sheets carries these substances through this pipe into the bottom of an upright vessel having inclined walls and vertical partitions. Owing to the location of these partitions, the water in the middle portion of the vessel becomes practically stagnant, so that the sand and heavier matters settle to the bottom, while the rubber particles are carried over an overflow with the water onto a very fine screen, through which the water is drained off. The rubber thus collected is now ready for devulcanization, which is preferably effected according to the process described in my application, Serial No. 324,583, filed September 20, 1889.

In the accompanying drawings is illustrated an apparatus constructed in accordance with the invention, Figure I being a vertical section, and Fig. II a plan view.

A represents the rotatory cylinder, which is inclined slightly downward toward its discharge end. Its periphery for the greater portion of its length is composed of perforated sheets $a$, of brass or other suitable material. The perforations are preferably of different sizes, being largest at the upper or feed end of the cylinder and finest at its discharge end. The sheets $a$ are supported on ribbed rings $b$, and the latter are carried by arms $c$, radiating from a central rod B. The cylinder is provided with three hoops or tires C, one at each end and one in the middle. These rest on friction-rollers D, by which the cylinder is supported. At the middle of the cylinder is a toothed gear E, which is engaged by a pinion F on shaft G. The latter receives motion through bevel-gears $g$ from a shaft H, which carries the fast and loose pulleys $h\ h'$. By these devices a rotatory motion is imparted to cylinder A when in operation.

Beneath the cylinder A is the tank or receptacle I, for receiving the water and all matters passing through the shell of the cylinder.

To protect the gears E and the supporting-rollers D, the cylinder is provided with guards *i*, which overhang these parts and divert the water, sand, &c., therefrom and into the receptacle I beneath.

At the upper or feed end of cylinder A is the hopper K, into which the stock is fed by the screw conveyer L. At this end is a pipe M for hot water, when required, and another pipe N for cold water. The latter pipe passes through the hopper and its discharge end enters the cylinder obliquely, so as to direct the stream of water against the side thereof.

Cylinder A is provided with longitudinal ribs O, attached internally to its shell. These ribs, when the cylinder is in motion, carry the stock up until their inclination to the vertical permits it to fall back to the bottom of the cylinder.

The tank I is provided with a drain-pipe P, which carries off the water with the particles of sand and other matters that pass through the perforations of the cylinder. In this mass is a comparatively small quantity of rubber in a very fine state of division, to recover which the pipe P is led to the bottom of a separator Q, entering it at *p*. The vessel Q has walls *q*, which diverge from either side of the inlet *p*, and has vertical partitions *r*, which inclose a space in the center of the vessel. Vessel Q discharges from a spout *s* upon a screen S sufficiently fine to arrest all particles of rubber that are carried by the water. Pipe P is provided at *t* with a sand-trap.

The operation of the apparatus is as follows: Motion being imparted to the cylinder A, rubber stock to be cleansed is fed into hopper K, which delivers it into the upper end of the cylinder, whose ribs O carry it round with the cylinder and let it fall when near the top. A strong stream of water is kept discharging through pipe N. This strikes with violence against the mass of stock in such direction as to shake out much sand and dirt at the outset, carrying such matters through the perforations at the upper end of the cylinder. As the latter continues to rotate, its inclination gradually carries the stock forward, causing it to traverse the entire length of the cylinder. During all this time, however, it is repeatedly taken up and let fall, being thus thoroughly shaken up with the water, so that by the time it issues from the discharge end into the elevator-boat T practically all the impurities or foreign substances which are capable of passing through the perforations have been eliminated. The bits or pieces of metal or other matters of a larger size are removed by other means. By the time the stock reaches the lower end of the cylinder the agitation it has received in the latter has freed it almost entirely from moisture, so that it is delivered to the elevator in practically a dry state. Much of the sand settles in tank I, but a considerable quantity of it and all the fine rubber particles, which are much lighter than the foreign substances, are carried by pipe P and delivered into the bottom of vessel Q. This is always full of water up to the overflow-spout *s*. The body of water inclosed by the partitions *r* is almost stagnant. Consequently all matters of greater specific gravity than water which may enter it will settle down. Moreover, this still body of water forces the incoming current to keep up the inclined sides *q* of the vessel, which current carries off all the fine particles of rubber onto screen S, whereas the sand and heavier impurities remain in the vessel Q and sand-trap *t*, whence they may be removed from time to time. The rubber arrested by screen S is very fine and pure, and it may be added to the main body of the stock when about to be devulcanized. Extending down the center of the space inclosed by partitions *r* is shown a small water-pipe R, having its outlet near the bottom of vessel Q. In the ordinary operation of the apparatus this pipe is not needed; but it is sometimes desired to treat masses of refuse removed in other operations—by magnetic separation, for example—and which may contain small quantities of rubber. In such case the mass to be treated is poured into the middle part of the vessel Q and water turned on through pipe R. The action is the same as above described.

By the use of this apparatus the fine particles of sand and gritty substances generally, which are present in old rubber stock in great quantity, and which have always been very troublesome in the operations of recovering rubber from waste articles, may be effectually removed and separated from the rubber without any appreciable loss of the latter, for the separator Q acts with such efficiency and economy as to make it profitable to treat large quantities of sand in which the rubber particles are so few in proportion as to be scarcely observable upon examination.

Having now fully described my said invention, what I claim, and desire to secure by Letters Patent, is—

1. An apparatus for washing rubber stock and separating sand therefrom, said apparatus comprising, in combination, a rotatable cylinder inclined downward from its feed end and having perforations of different sizes, the smaller perforations being at the lower end thereof, a water-pipe discharging into the upper end of the cylinder, and a receptacle beneath the latter for receiving the sand and water, substantially as described.

2. The combination, with the rotatable cylinder having a perforated shell, of the water-pipe discharging into said cylinder obliquely to the axis thereof, substantially as described.

3. The combination of the inclined perforated cylinder provided with internal longitudinal ribs, means for rotating said cylinder, and the water-pipe entering the feed end of the cylinder obliquely to the axis thereof, substantially as described.

4. The combination of the perforated cylinder, the water-pipe entering the same, means for rotating the cylinder, rollers supporting said cylinder, and guards surrounding the cylinder and overhanging said rollers, substantially as described.

5. The combination, with the perforated rotatory cylinder and the tank beneath the same, of the drain-pipe leading from said tank and the separator or vessel into the bottom of which said drain-pipe discharges, said vessel having walls divergent on each side of the inlet, an overflow-spout, and vertical partitions inclosing a portion of the vessel above the inlet, substantially as described.

6. The combination of the upright vessel having walls sloping inward toward the bottom, a pipe for discharging water into the bottom of said vessel, an overflow-spout, and vertical partitions inclosing a portion of said vessel above the water-inlet, substantially as described.

In testimony whereof I have signed this specification in the presence of two subscribing witnesses.

NATHANIEL C. MITCHELL.

Witnesses:
PHILIP MAURO,
C. W. CROASDILL.